Jan. 3, 1967 D. E. LUPFER 3,296,097
PREDICTIVE CONTROL OF DISTILLATION COLUMN INTERNAL REFLUX
Filed April 23, 1962 4 Sheets-Sheet 1

INVENTOR.
D.E. LUPFER
BY Young & Quigg
ATTORNEYS

INVENTOR.
D. E. LUPFER
BY Young E. Quigg
ATTORNEYS

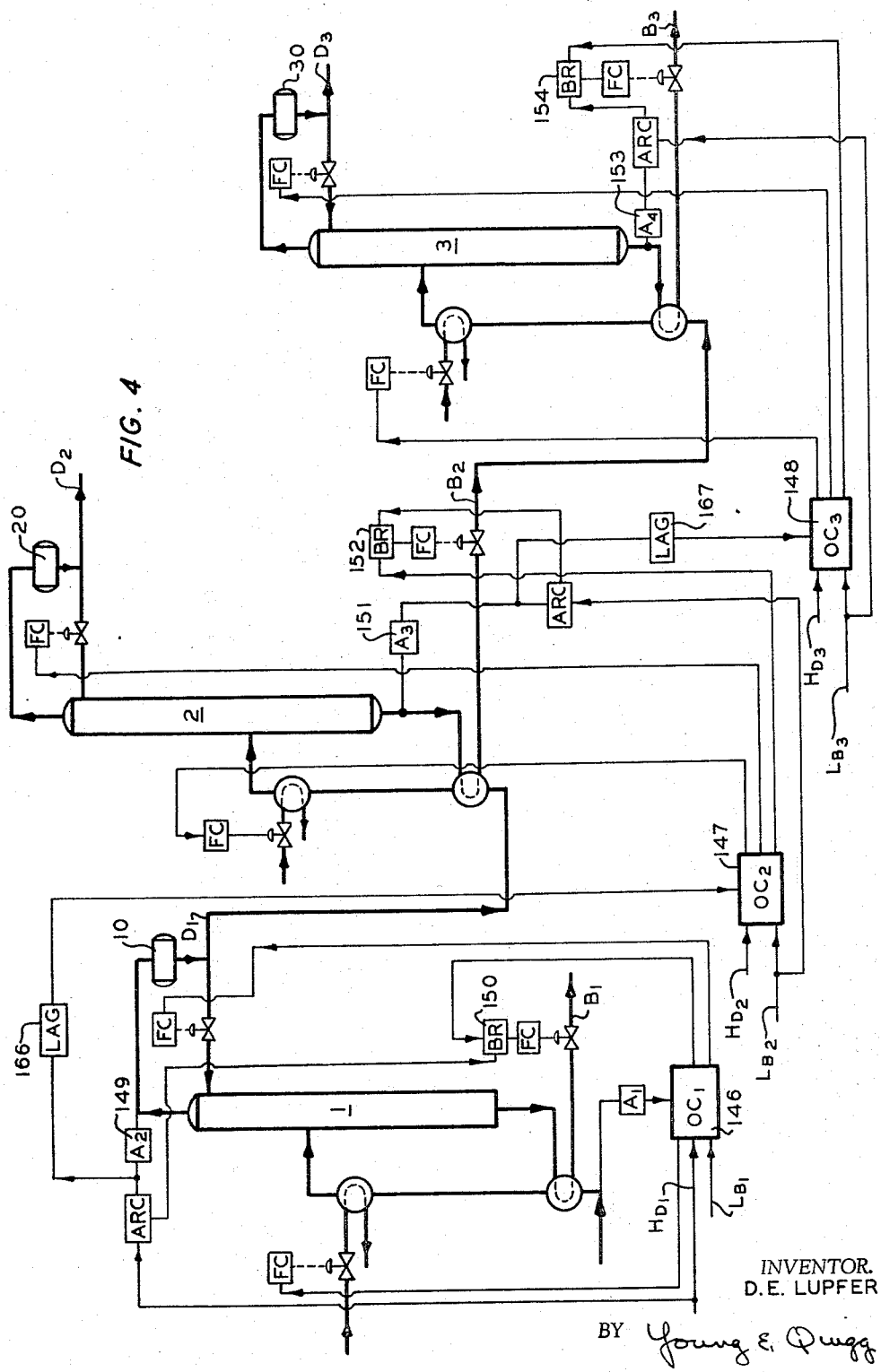

United States Patent Office 3,296,097
Patented Jan. 3, 1967

3,296,097
PREDICTIVE CONTROL OF DISTILLATION
COLUMN INTERNAL REFLUX
Dale E. Lupfer, Bartlesville, Okla., assignor to Phillips Petroleum Company, a corporation of Delaware
Filed Apr. 23, 1962, Ser. No. 189,375
12 Claims. (Cl. 203—2)

This invention relates to controlling the operation of a distillation column. In another aspect, this invention relates to a method and means for predicting what the internal reflux rate of a distillation column should be in order for the column to produce products of desired specifications. In another aspect, it relates to a method and means for automatically manipulating the external reflux flow rate of a distillation column in response to said internal reflux prediction. In a further aspect, it relates to a method and means for controlling the operation of a distillation column by an improved control system which automatically manipulates external reflux flow rate and bottom product flow rate to maintain the operation of the column at optimum levels and produce distillate and bottom products with specified purities.

There is ever-increasing activity in the art of fractional distillation to optimize the operation of a distillation column so that products with desired specifications can be produced for minimum operating costs at the column's optimum design value. Optimizing the operation of a distillation column is complicated, difficult and tricky because of the column's numerous degrees of freedom, which are characterized as independent input variables, some of which are controllable (e.g., feed temperature and reboiler heat flow) and other of which are uncontrollable (e.g., ambient temperature and feed composition). Many methods and means have been proposed, patented or used in an effort to reduce the column's degrees of freedom. However, there still remains a need for a suitable automatic method and means for optimizing the control of a distillation column to produce selected product specifications with minimum utilities consumption and maximum utilization of the unit.

One of the most important input variables of a distillation column is reflux flow rate. In striving for optimum operation, this variable must be manipulated, particuarly where there occurs disturbances in certain uncontrollable input variables, such as ambient temperature, cooling water, cooling air, and feed composition. The subject invention is particularly concerned with the automatic manipulation of this variable (reflux flow rate), as uncontrollable variables fluctuate, to maintain the specified operation of the column at optimum levels. Bottom product flow rate is another important input variable which must be manipulated to compensate for disturbances in such variables as feed composition and feed flow, and the subject invention is also concerned with the automatic manipulation of bottom product flow rate in combination with the automatic manipulation of reflux flow rate.

Accordingly, an object of this invention is to provide improved control of the operation of a distillation column. Another object is to provide a method and means for predicting what the internal reflux flow rate of a distillation column should be to produce products with desired purities. Another object is to provide a method and means for automatically manipulating the external reflux flow rate of a distillation column in response to such internal reflux flow rate prediction. Another object is to provide a method and means for automatically manipulating both external reflux flow rate and bottom product flow rate of a distillation column, notwithstanding changes in feed composition and feed flow rate, so as to produce distillate and bottom products with minimum specified purities at minimum operating costs and at the optimum maximum throughout of the column. Another object is to reduce the degrees of freedom of a distillation column by automatic adjustment of manipulated variables (including external reflux flow rate and bottom product flow rate) as uncontrolled variables (including feed composition and feed flow rate) change, to maintain the specified operation of the column. A further object is to maintain the specified operation of a distillation column at optimum levels by properly regulating all heat inputs to the column and by a novel predictive or feedforward control system predict what the internal reflux flow rate-to-feed flow rate ratio and bottom product flow rate of the column should be, and automatically implement corrective action to compensate for disturbances in uncontrolled variables such as feed composition and feed flow rate.

Further objects and advantages of this invention will become apparent to those skilled in the art from the following description, appended claims, and accompanying drawing in which:

FIGURE 4 is a schematic diagram of a train of distillation columns with control features of this invention associated therewith.

To provide a setting or background for the subject invention, there will be described in brief fashion a conventional distillation column, illustrated in FIGURE 1.

Figure 1:
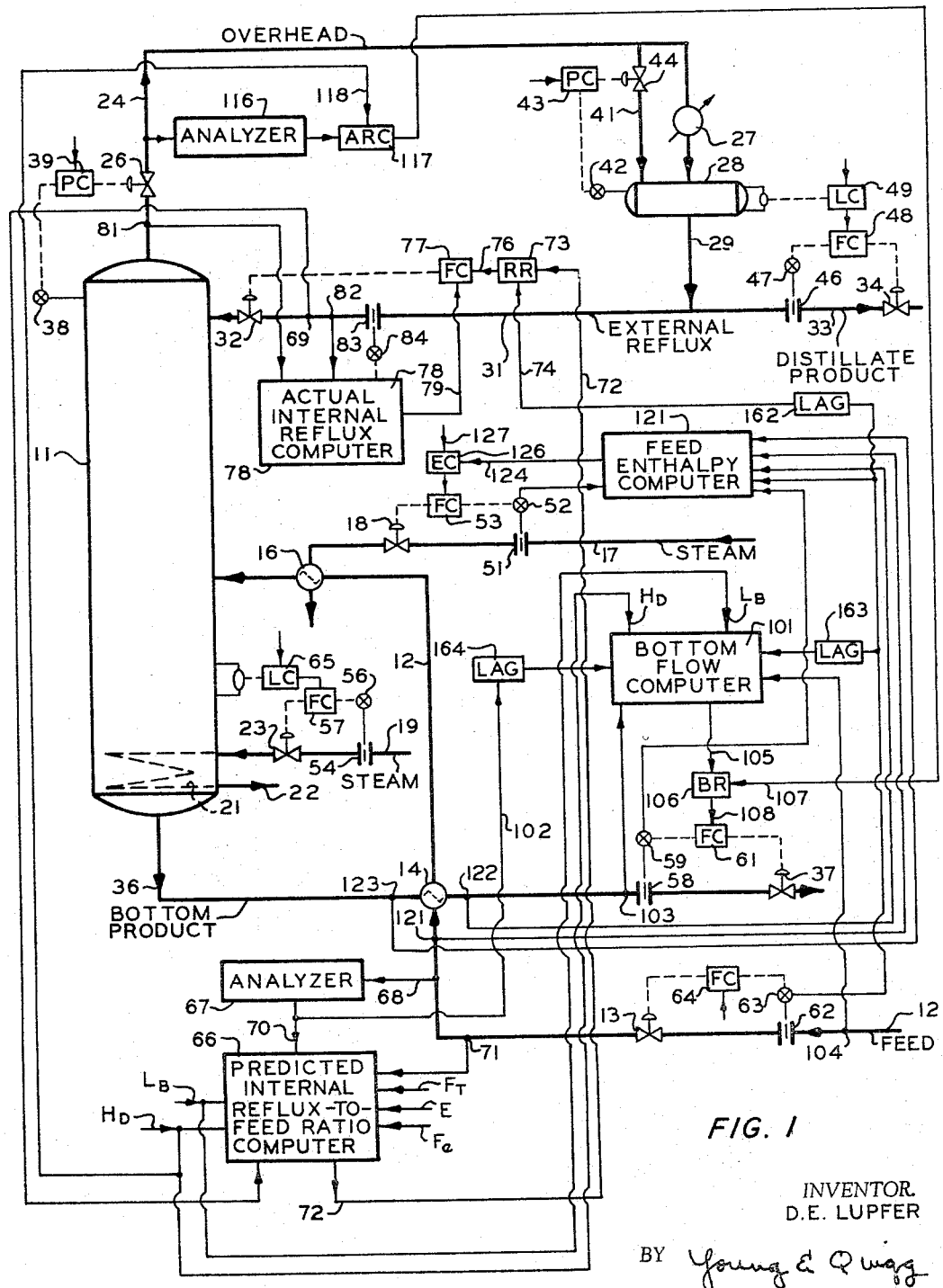
FIGURE 1 is a schematic diagram of a distillation column provided with certain features of this invention.

In FIGURE 1, there is shown a conventional fractional distillation column 11, which can be provided with a plurality of vertically spaced liquid-vapor contact trays (not shown). Feed comprising a multi-component mixture to be separated is supplied via line 12 and introduced onto a feed tray in column 11 located at an intermediate level therein, the flow rate of the feed being controlled by valve 13. Feed line 12 is associated with an indirect heat exchanger or economizer 14 and an indirect heat exchanger or preheater 16. An indirect heat exchange medium such as steam is supplied via line 17 to preheater 16, the flow rate of the heat exchanger medium being controlled by valve 18. Heat is supplied to the kettle of column 11 by circulation of steam or other heat exchange medium from supply line 19 through reboiler coil 21, the heat exchange medium being withdrawn from the coil via line 22. The flow rate of the heat exchange medium in line 19 is controlled by valve 23. Vapors are removed from the top of column 11 through overhead line 24, the flow rate being controlled by valve 26, and passed through a cooler 27 such as an air-cooled condenser, the resulting liquid being passed to an accumulator 28. Liquid distillate in accumulator 28 is withdrawn via line 29, and a portion of this withdrawn liquid is recycled via line 31 as external reflux to the top of column 11, the flow rate of the external reflux being controlled by valve 32. The balance of the liquid distillate withdrawn from accumulator 28 is removed from the system through line 33 and yielded as distillate product, the flow rate being controlled by valve 34. Bottom product is withdrawn from the kettle of column 11 via line 36 and it is passed in indirect heat exchange relationship through economizer 14 with the feed in line 12, the flow rate of the bottom product being controlled by valve 37.

Thus far, there has been described a conventional distillation column, which by itself does not constitute the subject invention. The object of the distillation column, of course, is to separate the multi-component feed into at least two fractions, an overhead and a bottom product. The light components of the feed will appear mainly in the overhead and the heavy components of the feed will appear mainly in the bottom product. The light components will comprise a light key component and components lighter than the light key component, while the heavy components will comprise a heavy key component and components heavier than the heavy key component. Since perfect separation between the two key components is impossible, some of the heavy key component will appear as an impurity in the overhead (and thus in the distillate product) and some of the light key component will appear as an impurity in the bottom product. However, the amounts of these impurities can be kept down to desired levels by proper operation of the column. The operation of a distillation column can be specified by specifying the fraction ($H_D$) of the heavy key component desired in the overhead (or distillate product) and the fraction ($L_B$) of the light key component desired in the bottom product. If these specifications are to be met at minimum operating costs and at maximum utilization of the column, corrective actions must be taken at the proper time and rate to minimize the effects of disturbances on product compositions and flows.

The operation of such a distillation column is affected by disturbances in independent input variables, (i.e., variables which can change or be changed independently without any effect of one upon the other). Such independent variables can either be manipulated or are uncontrolled. Feed composition and ambient temperature are examples of independent input variables which cannot be altered or controlled (within the limits of the process in question). Feed temperature, reflux temperature, and reboiler steam flow are examples of manipulated or controlled independent input variables. Then there are dependent output variables, such as the purities of the distillate and bottom products, which are a function or result of the independent variables. As should be evident, a distillation column has numerous degrees of freedom and any significant step in the control of the operation of a distillation column must reduce these degrees of freedom.

The degrees of freedom of the distillation column of FIGURE 1 can be reduced by providing it with minimum controls well known in the art. Referring now to the drawing, a constant pressure in the top of column 11 can be maintained by an assembly comprising a pressure transducer 38 and pressure controller 39 in conjunction with control valve 26. A constant pressure can be maintained in accumulator 28 by passing a small amount of overhead from line 24 to accumulator 28 via by-pass line 41, the constant pressure being provided by assembly comprising pressure transducer 42, pressure controller 43 and flow control valve 44. The flow rate in distillate product line 33 can be controlled by an assembly comprising orifice plate 46, differential pressure transducer 47 and flow controller 48 in conjunction with control valve 34, flow controller 48 being manipulated or cascaded by a liquid level controller 49 associated with accumulator 28, so as to maintain a constant liquid level in the accumulator. The volume flow rate of steam in line 17 can be controlled by an assembly comprising orifice plate 51, differential pressure transducer 52 and flow controller 53 in conjunction with flow control valve 18. The volume flow rate of steam in line 19 can be controlled by an assembly comprising orifice plate 54, differential pressure transducer 56 and flow controller 57 in conjunction with flow control valve 23. The flow rate of bottom product in line 36 can be controlled by an assembly comprising orifice plate 58, differential pressure transducer 59 and flow controller 61 in conjunction with control valve 37. Similarly, the flow rate of feed in line 12 can be controlled by an assembly comprising orifice plate 62, differential pressure transducer 63 and flow controller 64 in conjunction with flow control valve 13. Further reduction in the degrees of freedom in the column can be accomplished by using the level of liquid in the kettle of column 11 to manipulate the volume of steam passed via line 19 to the reboiler. Ths can be done by an assembly comprising a liquid level controller 65 which manipulates the setpoint of flow controller 57. The use of these minimum control features of the prior art reduces the number of the degrees of freedom of the column. However, many input variables can still affect the operation.

An input variable of primary concern in this invention is the reflux flow rate. Uncontrolled fluctuations in this variable can affect purity and operation costs. But in speaking about reflux flow rate, it is necessary to distinguish between external reflux flow rate and internal reflux flow rate. The external reflux flow rate is the flow rate of liquid returned to the top of the column, i.e., the flow rate of liquid in line 31 of FIGURE 1 controlled by valve 32. The internal reflux flow rate is the flow rate of liquid leaving the top tray and it is the sum of the external reflux flow rate plus the flow rate of that liquid which results from the condensation of vapors in the top of the column upon contact with the cool external reflux. Holding the flow rate of the external reflux constant is no guarantee that the internal reflux remains constant. Thus, for efficient operation it is the internal reflux flow rate which must be maintained at the optimum value. Unfortunately, it is difficult to measure the actual flow of internal reflux because there is no economical way to install an orifice plate or primary flow measuring device in the column.

Fluctuations or changes in the temperature of the external reflux and in the composition of the feed exert an effect on the liquid-vapor mass transfer taking place in the column. For any external reflux temperature and feed composition there will be an optimum internal reflux flow rate required to make a specified separation. Variations in the temperature of the external reflux are usually due to fluctuations in ambient temperature. This is especially true when air-cooled condensers are used to condense the overhead vapors of the column. Ambient temperature changes, for example due to sudden rainstorms or drop in temperature at night, produce changes in the temperature of the external reflux liquid being returned to the top of the column. This temperature variation affects the internal reflux flow rate in the column. For example, if the external reflux temperature drops, this means that more of the vapors in the top of the column will be condensed, resulting in a decrease in overhead product and an increase in bottom product with a simultaneous unnecessary increase in the purity of the overhead product and an undesirable decrease in bottom product purity.

There will now be described how, according to the subject invention, the internal reflux flow rate of a distillation column can be predicted and how the external flow rate can be accordingly manipulated to maintain the internal reflux flow rate at a desired value, so that distillate and bottom products with specified purities can be produced.

Briefly, measurements are made of feed flow rate and feed components, signals are produced proportional to such measurements and these signals are combined with other signals proportional to certain constants in a predictive, statistically-derived equation for internal reflux flow rate based on the expression:

$$R_{IP} = f(F, F_c, E, F_T, F_e, H_D, L_B) \qquad (1)$$

$R_{IP}$ = predicted internal reflux flow rate (vol./unit time)
$F$ = feed flow rate (vol. unit time)
$F_c$ = generic symbol for components in feed, each expressed as a liquid volume fraction of feed
$E$ = average column tray efficiency
$F_e$ = feed enthalpy (B.t.u./lb.)
$F_T$ = feed tray (numbering trays from top of column)
$H_D$ = specified liquid volume fraction of heavy key in distillate product
$L_B$ = specified liquid volume fraction of light key in bottom product A signal proportional to the predicted internal reflux flow rate, or a signal proportional to the ratio of predicted internal reflux flow rate-to-feed flow rate, can be recorded by a recorder (not shown) and used for monitoring purposes only, but preferably such signal is fed forward as a setpoint-adjusting signal to trim the setpoints of downstream process variable controllers, such as the flow rate controller used to manipulate external reflux flow rate. This predictive corrective action compensates for changes in feed composition and feed flow rate, and the corrective action is taken at the proper rate and time to minimize the effect of such changes on the desired product purities. The system used to make this corrective action is called a predictive or feed-forward control system.

The exact equation used to predict what the internal reflux flow rate of the distillation column should be to obtain a specified separation will vary. But, having determined what independent variables are significantly related to internal reflux, it is possible by straight-forward, well-known statistical methodology to determine how these significant variables can be combined in an equation to predict internal reflux flow rate with specified limits of accuracy to compensate for changes in feed composition and feed flow. One means of developing such an equation is the response surface experiment or empirical surface study, wherein the approximate value of internal reflux is found on the basis of the independent variables. This empirical study of internal flux will be adequate when the ranges of the independent variables are predetermined, and when the effects of other factors are known to be insignificant or constant. The procedure for determining the response surface is straight-forward. For this purpose, the Box-Wilson central composite designs will be quite useful since they will determine the curvature in the response surface in the region of interest. These designs provide data estimating linear, quadratic, and two-factor interaction effects by measuring each variable at five different levels, and, where plant data is used rather than theoretical data, repeating a single observation several times in order to estimate the non-reproducibility of the measurements. When the functional relationship between internal reflux and the independent variables has thus been determined, it then is necessary to determine the coefficients in the predictive equation. One common method of analysis which can be used to determine these coefficients is called regression analysis. Regression analysis assumes a relationship between the dependent variable (internal reflux) and each term in the proposed equation, and determines the best set of coefficients for the predictive equation. The criterion for calculating the best set of constants for the equation is Gauss' familiar Principle of Least Squares, and it determines the percent of the variation in internal reflux that is explained by the equation, and establishes the precision of the equation in terms of Standard Error of Estimate.

The following summarizes the statistical approach in deriving a predictive equation for internal reflux:

(1) Select all independent variables believed to exert a significant effect upon internal reflux;

(2) Design and carry out screening experiments to test for the significant effects of the independent variables;

(3) Perform a correlation analysis to identify variables which should be represented in a predictive equation;

(4) Perform a surface response experiment either on the actual operating column or by tray-to-tray calculations (e.g., on a digital computer) to obtain data, using a suitable experimental design for data gathering, such as the Box-Wilson composite design; and (5) Using regression analysis, determine the best set of coefficients for an assumed form of the predictive equation and determine the precision of the equation in terms of Coefficient of Determination and Standard Error of Estimate.

Those skilled in the art of statistics will be able to determine the predictive equation for internal reflux for any distillation column, in view of the foregoing discussion.

As an example, the distillation column 11 of FIGURE 1 is used as a debutanizer to separate a mixture of hydrocarbons to produce a distillate product comprising ($iC_5$), normal butane ($nC_4$), isobutane ($iC_4$), and propane ($C_3$), and a bottom product comprising normal butane ($nC_4$), isopentane ($iC_5$), normal pentane ($nC_5$) and some components heavier than $nC_5$ designated $C_6^+$. Isopentane ($iC_5$) is the heavy key component and appears as an impurity in the distillate product, while normal butane ($nC_4$) is the light key component and appears as an impurity in the bottom product.

The data of Table I is representative of the statistical designed experiment that was necessary to describe the surface response of column 11.

TABLE I

| Run | Feed components (liquid volume, percent) | | | Product specifications (liquid volume, percent) | | E | $F_e$ [1] | $F_T$ [2] | $R_{Ip}/F$ |
| --- | --- | --- | --- | --- | --- | --- | --- | --- | --- |
| | $C_3+iC_4$ | $nC_4$ | $iC_5$ | $L_B$ | $H_D$ | | | | |
| 1 | 37.0 | 30.5 | 13.0 | 1.0 | 0.2 | 74 | 11 | 19 | 1.028 |
| 2 | 26.0 | 25.5 | 13.0 | 1.0 | 0.4 | 74 | 25 | 31 | 0.844 |
| 3 | 37.0 | 25.5 | 9.0 | 1.0 | 0.4 | 74 | 11 | 19 | 0.724 |
| 4 | 26.0 | 30.5 | 13.0 | 0.4 | 0.4 | 60 | 25 | 31 | 1.454 |
| 5 | 26.0 | 25.5 | 9.0 | 1.0 | 0.4 | 60 | 25 | 31 | 0.825 |
| 6 | 37.0 | 25.5 | 13.0 | 0.4 | 0.4 | 74 | 25 | 19 | 0.884 |
| 7 | 26.0 | 30.5 | 9.0 | 0.4 | 0.4 | 74 | 25 | 31 | 0.861 |
| 8 | 37.0 | 30.5 | 9.0 | 0.4 | 0.4 | 60 | 11 | 19 | 0.906 |
| 9 | 31.5 | 23.0 | 11.0 | 0.7 | 0.3 | 67 | 18 | 25 | 0.759 |
| 10 | 20.5 | 28.0 | 11.0 | 0.7 | 0.3 | 67 | 18 | 25 | 0.827 |
| 11 | 42.5 | 28.0 | 11.0 | 0.7 | 0.3 | 67 | 18 | 25 | 0.864 |
| 12 | 31.5 | 28.0 | 11.0 | 0.7 | 0.3 | 67 | 4 | 25 | 0.816 |
| 13 | 31.5 | 28.0 | 11.0 | 0.7 | 0.3 | 67 | 32 | 25 | 0.875 |
| 14 | 31.5 | 28.0 | 11.0 | 0.2 | 0.3 | 67 | 18 | 25 | 1.036 |

[1] Reference temp., 151° F.
[2] Trays numbered from top of column.

Eighty-one runs were actually used to describe the surface and the runs in Table I are typical. The data for this experiment were obtained by tray-to-tray calculations on an I.B.M. 7090 digital computer. It is also possible to obtain the data from an actual operating column. However, this presents many problems, chief among which is that the variables usually do not change or cannot be changed over the range necessary to complete the statistically designed experiment. The internal reflux flow rate was defined by the following expression:

$$R_{Ip} = f(C_3, iC_4, nC_4, iC_5, nC_5, F, E, F_T, F_e, H_D, L_B) \quad (2)$$

where:

$R_{Ip}$ = predicted internal reflux flow rate (vol./unit time)
$C_3$ = liquid volume fraction of propane in feed
$iC_4$ = liquid volume fraction of isobutane in feed
$nC_4$ = liquid volume fraction of normal butane in feed
$iC_5$ = liquid volume fraction of isopentane in feed $nC_5$ = liquid volume fraction of normal pentane in feed
$F$ = feed flow rate (vol./unit time)
$E$ = average column tray efficiency
$F_T$ = feed tray location (trays numbered from top of column)
$F_e$ = feed enthalpy (B.t.u./lb.)
$H_D$ = specified liquid volume percent fraction of isopentane desired in distillate
$L_B$ = specified liquid volume percent fraction of normal butane desired in bottom product.

Equation 2 shows that the value for $R_{Ip}$ is a function of the specified product purities, $H_D$ and $L_B$, feed enthalpy $F_e$, feed tray location $F_T$, average column tray efficiency $E$, feed flow $F$, and feed compositions ($C_3$, $iC_4$, $nC_4$, $iC_5$, $nC_5$). A study of the feed stream indicated that the composition variables could be simplified. A specific relationship was found between isopentane ($iC_5$) and normal pentane ($nC_5$). The relationship was expressed by an independent equation which states that the ratio of these two components is constant. Only one of the two components needed to be included as a variable in the internal reflux equation. The feed stream component variables were further simplified by treating the sum of propane ($C_3$) and isobutane ($iC_4$) as a single variable ($C_3 + iC_4$). Another variable included is the average tray efficiency ($E$). The ratio of internal reflux flow ($R_{Ip}$) to feed flow $F$ is a function of all other variables of the system. The equation was developed for the ratio $R_{Ip}$ to $F$:

$$\frac{R_{Ip}}{F} = f[(C_3+iC_4), nC_4, iC_5, E, F_T, F_e, H_D, L_B] \quad (3)$$

Based on data such as shown in Table I and Equation 3, the following predictive statistically-derived equation was developed:

$$\frac{R_{Ip}}{F} = K_1 + iC_5[K_2 + K_3(nC_4) + K_4(iC_5) + K_5(C_3+iC_4)] + K_6(C_3+iC_4) \quad (4)$$

where:

$K_1 = A_1 + A_2(F_T)^2 + A_3 E + A^4(E)^2 + A_{23}(F_e)^2 + H_D[A_9 + A_{10}(H_D) + A_{11}(L_B) + A_{12}(E)] + L_B[A_5(L_B) + A_6(E) + A_7 + A_8(F_T)]$
$K_2 = A_{13}(L_B) + A_{14}(E)(H_D) + A_{15}(E) + A_{17}(H_D) + A_{16}(E)(F_T)$
$K_3 = A_{18} + A_{19}(E)$
$K_4 = A_{20}$
$K_5 = A_{21}(E)$
$K_6 = A_{22}(F_e)$
$A_1$ through $A_{23}$ = constants Since volume flow measurements are involved, it was desirable to refer the reflux volume flow measurement to a temperature base equal to the feed temperature. With this correction, Equation 4 becomes:

$$\frac{R_{Ip}}{F} = (1 + K_R \Delta T')\{K_1 + iC_5[K_2 + K_3(nC_4) + K_4(iC_5) + K_5(C_3+iC_4)] + K_6(C_3+iC_4)\} \quad (5)$$

where:

$K_R$ = coefficient of thermal expansion of external reflux (change in volume/unit volume/° F.)
$\Delta T' = T_R - T_F$
$T_R$ = temperature of external reflux, ° F.
$T_F$ = temperature of feed upstream of economizer, ° F.

Examination of Equation 5 shows that it is necessary to measure the temperature $T_R$ of the external reflux, the temperature $T_F$ of the feed stream upstream of the economizer, and the fractions of feed components $C_3$, $iC_4$, $nC_4$, $iC_5$. Feed enthalpy $F_e$, tray efficiency $E$, and feed tray $F_T$ are inserted as constants. $E$ is adjusted when necessary to up-date the equation due to changes in column efficiency because of deposition of coke, etc.

Referring again to FIGURE 1, I have designated as 66 a computer which can be used to automatically solve Equation 5 for a predictive value of internal reflux-to-feed flow ratio. Computer 66 is associated with an analyzer 67, the latter being in communication with feed line 12 by reason of a sampling line 68. Analyzer 67 comprises any suitable instrument which continuously or substantially continuously (i.e., rapid cycle) analyzes the feed and determines the relative amounts, e.g., liquid volume percent, of the components in the feed which function as independent variables in the predictive equation, and produces signals proportional thereto. Analyzer 67, such as described in I.S.A. Journal, vol. 5, No. 10, p. 28, October 1958, preferably comprises a high speed chromatographic analyzer having a sampling valve, motor detector, chromatographic column, programmer, and a peak reader, the latter functioning to read the peak height of the components, giving an equivalent output signal which is suitable for control purposes. In operation, sample flows continuously through the analyzer. At a signal from the programmer, a measured volume of sample is flushed into the chromatographic column. When the component arrives at the detector, the resulting signal is measured, amplified, and stored until the next signal when the sequence is repeated. The stored signal is a continuous output signal analogous to the amount of the components present. Such an analyzer and the operation thereof are well known in the art.

Specifications $L_B$ and $H_D$ for the column operation as well as constants $F_T$, $E$, and $F_e$, can be dialed into computer 66. The temperature $T_R$ of the external reflux can be measured by a suitable thermocouple 69 in external reflux line 31 and transmitted to computer 66. Temperature $T_F$ of the feed upstream of economizer 14 can be likewise measured by a suitable thermocouple 71 in feed line 12 and transmitted to computer 66. The predicted ratio $R_{Ip}/F$ computed in computer 66 is transmitted as an output signal via signal line 72 to a ratio relay 73 (or multiplier) where it is multiplied by a signal proportional to feed flow rate F, the latter being transmitted from a linear flow transmitter 63 via signal line 74. The resultant signal from ratio relay 73, proportional to $R_{Ip}$ is then transmitted by signal line 76 to a flow controller 77 where it is compared with a computed or inferentially measured value of the actual internal reflux flow rate $R_{Im}$ in column 11, the actual internal reflux value being computed in computer 78 and transmitted by signal line 79 to flow controller 77. If the predicted internal reflux flow rate $R_{Ip}$ is larger than the measured internal reflux flow rate $R_{Im}$, flow controller 77 accordingly will increase the flow rate of external reflux flowing in line 31 by further opening flow control valve 32. Conversely, if the predicted internal reflux flow rate $R_{Ip}$ is less than the measured internal reflux flow rate $R_{Im}$, flow controller 77 will accordingly decrease the flow rate of external reflux in line 31 by decreasing the extent to which flow control valve 32 is opened. Accordingly, the internal reflux flow rate of the column is manipulated. Thus, fluctuations in feed compositions are compensated for by changing the internal reflux flow rate indirectly by manipulating the external reflux flow rate. In addition, if the measured internal reflux flow rate $R_{Im}$ deviates from the predicted internal reflux flow rate $R_{Ip}$ due to external reflux temperature changes, flow controller 77 is adjusted to change the external reflux flow rate and bring the measured internal reflux flow rate $R_{Im}$ back to the predicted internal reflux flow rate $R_{Ip}$ supplied as a setpoint signal 76 to flow controller 77.

The preferred manner of making the measurement or computation of the actual internal reflux flow rate $R_{Im}$ is that described and claimed in copending application U.S. Patent No. 3,018,229 issued January 23, 1962 to Lyman W. Morgan. Briefly, this measurement of the actual internal reflux is accomplished by solution of the equation:

$$R_{Im} = R_{Em}(1 + K\Delta T) \quad (6)$$

where:

$R_{Im}$=computed actual internal reflux flow rate (unit vol./unit time)

$R_{Em}$=measured external reflux flow rate (unit vol./unit time)

$K=C_p/\lambda$ $C_p$=specific heat of external reflux (or liquid on top tray) (B.t.u./unit vol./° F.)

$\lambda$=heat of vaporization of liquid on top tray (B.t.u./unit volume)

$\Delta T=T_O-T_R$ $T_O$=temperature of overhead vapor (or liquid on top tray) (° F.)

$T_R$=temperature of external reflux (° F.)

Referring again to FIGURE 1 the computation of the actual internal reflux flow rate $R_{Im}$ can be accomplished by computer 78. The temperature $T_O$ is detected by a thermocouple 81 in overhead line 24, and the temperature $T_R$ is measured by a thermocouple 82 in external reflux line 31, and these temperatures are transmitted to computer 78. In addition, an orifice plate 83 in external reflux line 31 together with a flow transducer 84 provides a means for measuring the external reflux flow rate $R_{Em}$, the differential pressure across orifice plate 83 being transmitted by transmitter 84 to computer 78 as a signal proportional to said differential pressure.

Figure 2:
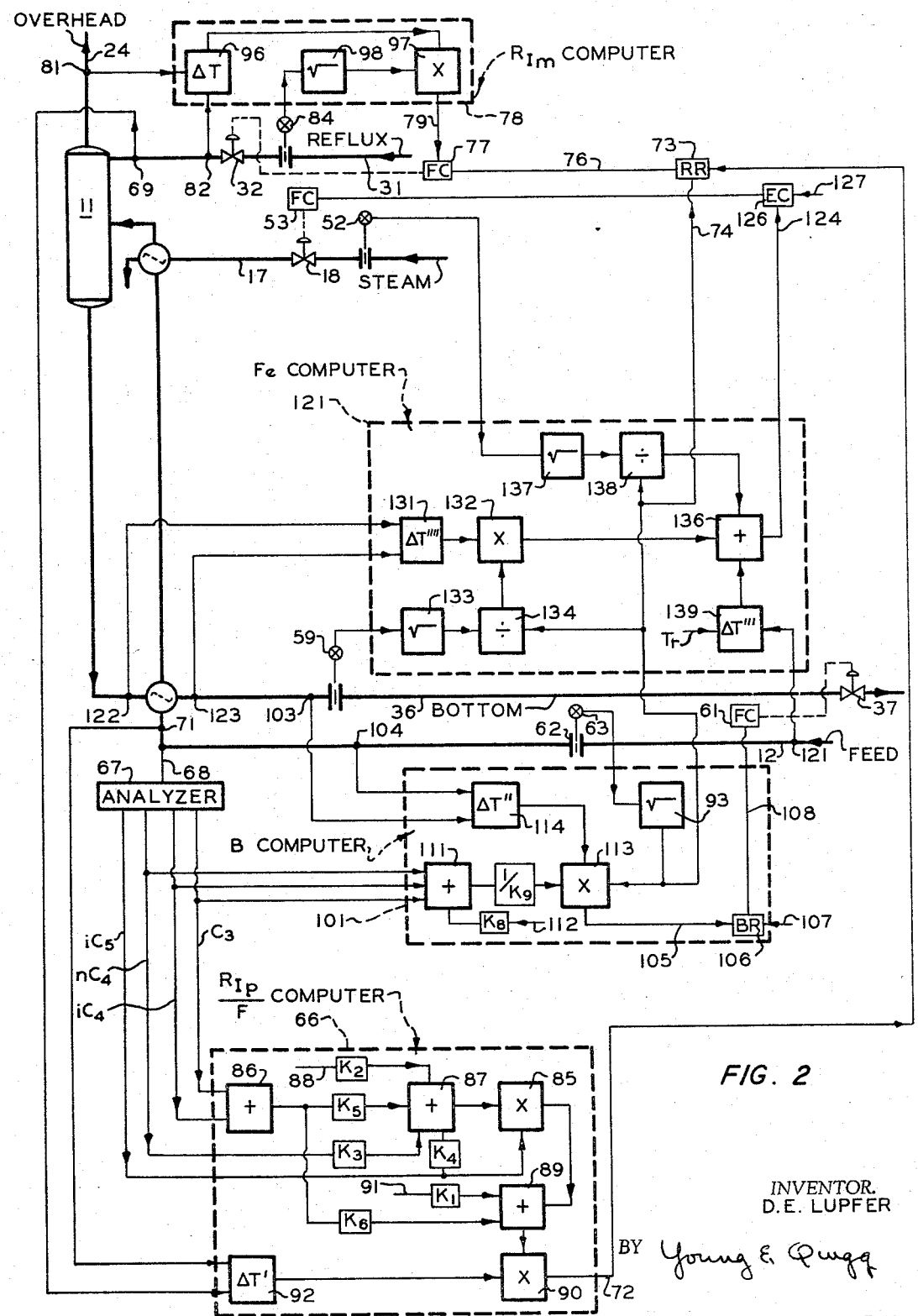
FIGURE 2 is a schematic diagram of a distillation column provided with certain mathematical analog instrumentation of this invention.

In FIGURE 2, I have schematically illustrated a novel combination of analog instruments which can be used in the solution of Equation 5 for prediction of internal reflux to feed flow ratio, $R_{Ip}/F$, such instrumentation being illustrated in association with column 11 of FIGURE 1. Other computers such as digital computers can also be used. Referring now to FIGURE 2 in detail, I have schematically illustrated analyzer 67 as producing output signals $C_3$, $iC_4$, $nC_4$ and $iC_5$, the feed composition signals necessary in solving the predictive Equation 5. Signals $C_3$ and $iC_4$ are added by adder 86 to provide a signal proportional to the sum $(C_3+iC_4)$. This latter signal is transmitted to a potentiometer $K_5$ and the resulting product signal $K_5(C_3+iC_4)$ is transmitted to adder 87. A reference potential 88 is applied across a potentiometer $K_2$ and the output signal therefrom is also transmitted to adder 87. Signal $nC_4$ from analyzer 67 is applied across a potentiometer $K_3$ and the resulting product signal $K_3(nC_4)$ is also transmitted to adder 87. Signal $iC_5$ from analyzer 67 is applied across a potentiometer $K_4$ and the resulting product signal $K_4(iC_5)$ is also transmitted to adder 87. Adder 87 sums or adds the four input signals supplied thereto and produces an output signal proportional to $$[K_2+K_3(nC_4)+K_4(iC_5)+K_5(C_3+iC_4)]$$

which signal is transmitted to a multiplier 85 where it is multiplied by signal $iC_5$. The resulting product signal is then transmitted to adder 89. A reference potential 91 is applied across a potentiometer $K_1$ and the output signal therefrom is also supplied to adder 89. In addition, a signal proportonal to $(C_3+iC_4)$ from adder 86 is applied across a potentiometer $K_6$, and the resulting product signal $K_6(C_3+iC_4)$ is also transmitted to adder 89. Adder 89 adds the three input signals supplied thereto and produces an output signal proportional to $$K_1+iC_5[K_2+K_3(nC_4)+K_4(iC_5)+K_5(C_3+iC_4)]+K_6(C_3+iC)_4$$

This output signal is transmitted to multiplier 90. The term $\Delta T'$ of Equation 5 is measured by a differential temperature transducer 92 which compares the temperature $T_R$ measured by thermocouple 69 with the temperature $T_F$ measured by thermocouple 71. The output signal from transducer 92 is calibrated to provide signal proportional to $(1+K_R\Delta T')$, the constant 1 being added by adjustment of the transducer's zero point and the constant $K_R$ is taken care of by adjustment of the transducer's span. The signal from transducer 92 is transmitted to multiplier 90. Multiplier 90 accordingly produces an output signal proportional to $R_{Ip}/F$ ratio of Equation 5, and this output signal is transmitted by signal line 72 to ratio relay 73 where it is multiplied by a signal F supplied by signal line 74 to give $R_{Ip}$. Signal F is obtained by transmitting the differential pressure measurement of flow transducer 63 associated with feed line 12 to a square root extractor 93. The resulting output signal of ratio relay 73 (which functions as a multiplier circuit) is proportional to the predicted internal reflux flow rate $R_{Ip}$ and it is transmitted to flow controller 77 by signal line 76 for comparison with the actual or computed internal reflux flow rate $R_{Im}$ transmitted to flow controller 77 by signal line 79.

The computation of the actual reflux flow rate $R_{Im}$ is accomplished by the method and means of said U.S. Patent No. 3,018,229. Briefly, a differential temperature transducer 96 compares the temperature $T_O$ of the overhead vapor as indicated by thermocouple 81 with the temperature $T_R$ of the external reflux as detected by thermocouple 82. Transducer 96 is calibrated to provide a signal proportional to the term $(1+K\Delta T)$, the constant 1 being added by adjustment of the transducer's zero point and the constant $K$ taken care of by adjustment of the transducer's span. This product signal proportional to the term $(1+K\Delta T)$ of Equation 6 is supplied to a multiplier 97 where it is multiplied by a signal proportional to $R_{Em}$. The latter signal is obtained by means of differential pressure transducer 84 which transmits a signal representative of the differential pressure across orifice plate 83 to a square root extractor 98, the latter producing the signal $R_{Em}$. The output signal from multiplier 97 is proportional to the actual or computed internal reflux flow rate $R_{Im}$ and it is transmitted by signal line 79 to flow controller 77 for comparison with the predicted internal reflux flow rate $R_{Ip}$ supplied as a setpoint signal by signal line 76. Flow controller 77 accordingly manipulates flow control valve 32 to maintain the proper internal reflux flow rate.

As mentioned hereinbefore, the bottom product flow rate is another important input variable which can be manipulated to compensate for disturbances in such variables as feed composition and feed flow, and the automatic manipulation of bottom product flow rate in combination with the automatic manipulation of reflux flow rate further reduces the effects of disturbances on column performance. The bottom product flow is preferably computed by that system disclosed and claimed in my copending application Serial No. 118,066 filed June 19, 1961, Patent 3,224,947, issued December 21, 1965. I have illustrated in FIGURE 1 a bottom product flow computer 101. The general equation for bottom flow rate can be expressed as:

$$B=f(F_c, F, H_D, L_B) \qquad (7)$$

where:

$B$=predicted flow rate of bottom product, (volume/unit time)

$F_c$=generic symbol for the sum of the light key component and components lighter than the light key, each expressed as a liquid volume fraction of feed $F$=feed flow rate (volume/unit time)

$H_D$=specified fraction of heavy key in distillate (liquid volume decimal fraction)

$L_B$=specified fraction of light key in bottoms product (liquid volume decimal fraction)

In the example where column 11 of FIGURE 1 is used as a debutanizer, Expression 7 becomes $$B=f(C_3, iC_4, nC_4, F, H_D, L_B) \qquad (8)$$

where:

$H_D$=specified fraction of isopentane in distillate (liquid volume decimal fraction)

$L_B$ = specified fraction of normal butane in bottom product (liquid volume decimal fraction)

Thus, like the Equation 1 for predicted internal reflux flow rate to feed flow rate, the equation for bottom product flow rate B required to maintain product purities is a function of the specified product purities $H_D$ and $L_B$, feed flow F, and feed composition ($C_3$, $iC_4$, $nC_4$). In developing the predictive equation for B by a material balance, the four variables $iC_5$, $nC_5$, $F_T$ and $F_E$ are not required. The exact bottom product flow rate predictive equation can be derived from a material balance, and this equation is expressed as:

$$B = F\left(\frac{K_8 - C_3 - iC_4 - nC_4}{K_9}\right) \quad (9)$$

where:

B = predicted volume flow rate of bottom product if flow is measured at temperature equal to feed temperature
F = volume flow rate of feed when measured at existing feed temperature
$K_8 = 1 - H_D$
$K_9 = 1 - H_D - L_B$ Equation 9 shows that bottom product flow rate can be computed if $H_D$ and $L_B$ are specified and if the feed flow F and feed components $C_3$, $iC_4$ and $nC_4$ are known. Computer 101 is applied to manipulate B as a function of these variables. This computer 101 has the following inputs: feed composition, determined by analysis of the feed; feed flow; and operating specifications $H_D$ and $L_B$. When feed composition and/or feed flow changes, a new value of bottom product flow is computed and the computed value of bottom product flow rate is gradually forced upon the column in a predictive manner.

There is one practical consideration which must be made when applying Equation 9 to an operating column. This consideration arises when feed flow F and bottom product flow B are measured in volume per unit time. Equation 9 assumes the volume flows B and F are at the same temperature. If they are not at the same temperature, compensation is necessary. One method of compensating requires that bottom product flow B be referred to feed temperature by multiplying the right side of Equation 9 by the quantity:

$$1 + K_B \Delta T'' \quad (10)$$

where:

$K_B$ = coefficient of thermal expansion (change in vol./unit vol./° F.)
$\Delta T'' = T_{B2} - T_{F1}$
$T_{B2}$ = temperature of bottom produce at point where bottom flow is measured (° F.)
$T_{F1}$ = temperature of feed at point where feed flow is measured (° F.)

Equation 9 with the necessary compensation becomes:

$$B = F(1 + K_B \Delta T'')\left(\frac{K_8 - C_3 - iC_4 - nC_4}{K_9}\right) \quad (11)$$

where:

B = volume flow rate of bottom product at existing temperature

Referring now to FIGURE 1, the feed composition information needed in the solution of Equation 11 can be supplied from analyzer 67 to bottom flow computer 101 by signal line 102. The temperature $T_{B2}$ of the bottom product and the temperature $T_{F1}$ of the feed are detected by thermocouples 103 and 104, respectively, and transmitted to computer 101, as is the feed flow rate signal from flow transducer 63 associated with feed line 12. In addition, the product specifications $H_D$ and $L_B$ are dialed into the computer 101. The computed bottom product flow rate B is transmitted as an output signal 105 by computer 101 to a biasing device 106 such as a conventional summing relay. The biasing device 106 accordingly produces an output signal 108 which serves as the setpoint for flow controller 61 of the bottom product line 36.

Computer 101 of FIGURE 1 is shown in more detail in FIGURE 2. In FIGURE 2, signals proportional to $C_3$, $iC_4$ and $nC_4$ are transmitted from analyzer 67 to a summing relay 111, as is a reference potential 112 proportional to $K_8$ of Equation 11. The sum from relay 111 is applied across a potentiometer $1/K_9$ and the resulting product proportional to $(K_8 - C_3 - nC_4 - iC_4)/K_9$ is then transmitted to a multiplier 113. The temperatures $T_{B2}$ and $T_{F1}$, detected by thermocouples 103 and 104, respectively, are supplied to a differential temperature transducer 114. Transducer 114 compares temperatures $T_{B2}$ and $T_{F1}$ to determine $\Delta T''$. Transducer 114 is calibrated to provide an output signal proportional to $1 + K_B \Delta T''$. The constant 1 is added by adjustment of the transducer's zero point and the constant $K_B$ is taken care of by adjustment of the span of transducer 114. The signal from transducer 114 is transmitted to multipler 113 as is a signal from square root extractor 93 proportional to feed flow F. The three inputs of multiplier 113 are multiplied and the resultant output signal proportional to B is transmitted by signal line 105 to bias relay 106. The output of biasing device 106 is transmitted by signal line 108 for manipulation of control valve 37 by bottom product flow controller 61.

As described hereinbefore, the internal reflux computer is utilized in a predictive manner to control the internal reflux. Since predictive controls as such may often only be approximate and not exact, I prefer to override the control operation with feedback control. To achieve this feedback control, referring again to FIGURE 1, I prefer to analyze the overhead in line 24 (if this is the more important product) by means of an analyzer 116 to determine the concentration of the heavy key component, e.g., isopentane. Analyzer 116 can be a chromatographic, infrared, or ultraviolet analyzer, or the like, or a mass spectrometer, or any other suitable analyzer which will measure the concentration of the component and provide a signal representative thereof. Analyzer 116 produces an output signal corresponding to the concentration of the heavy key in overhead line 24 and it is transmitted to a controller 117, such as an analyzer recorder controller, where it is compared with a setpoint signal 118 proportional to $H_D$. Any difference in the actual or measured heavy key concentration in the overhead and $H_D$ is transmitted as a signal to bias relay 106. For example, if the key component in the bottom product is on specification, but the key component in the overhead is less than the specified concentration $H_D$, this means that the overhead (and consequently the distillate) has a purity greater than that necessary, i.e., that the column is being operated at operating costs greater than minimum. Accordingly, the analyzer controller 117 produces a signal 107 which can add to or subtract from the computed bottom flow signal 105. If computed bottom flow signal 105 is exactly that required to give the overhead product purity specified, signal 108 will equal signal 105. Due to errors in measurements and computing, signal 105 will be slightly altered by signal 107 to always produce the exact bottom flow setpoint 108 required.

Where the bottom product purity is of more importance than the distillate purity, analyzer means can analyze instead the bottom product to determine the concentration of the light key component therein, and the difference between this measurement and $L_B$ can be used to bias the computed bottom flow signal 105.

Although the predictive control systems for internal reflux and bottom product flow discussed above significantly reduce the degrees of freedom of a distillation column so that improved control of the distillation operation is effected and practical profits obtained, I prefer in another aspect of this invention to regulate the feed enthalpy (heat content), since this will improve operation of the column. Where the feed rate changes, or where the feed must be heated to its bubble point or must be partially vaporized, any variations in feed flow, initial feed enthalpy, steam, steam supply conditions, or bottom product flow, may give rise to substantial changes in feed enthalpy with very little or no change in feed temperature. So, I prefer in combination with the above-described control of reflux and bottom product to compute the enthalpy of the feed and regulate it notwithstanding a wide range of feed flow rates, changes in the physical state of the feed, and flow disturbances in the heat exchange medium. The system I prefer to use to accomplish this is that disclosed in copending application Serial No. 125,025 filed July 3, 1961 by M. W. Oglesby and D. E. Lupfer.

Where the feed heated in the economizer is not vaporized but remains in the liquid state, and the heated liquid feed is then passed to a preheater, and is then introduced into the column, the enthalpy of the feed can be computed from the following equation:

$$F_e = C_{pF}(T_f - T_r) + (S/F)h_s \qquad (12)$$

where:

$F_e$ = total enthalpy of feed leaving preheater above reference temperature $T_r$, (B.t.u./lb.)
$C_{pF}$ = average specific heat of feed (B.t.u./lb.×° F.)
$T_f$ = temperature of feed at exit of economizer exchanger (° F.)
$T_r$ = reference temperature (° F.)
$S$ = steam flow (lb./hr.)
$F$ = feed flow (lb./hr.)
$h_s$ = difference in enthalpy of steam entering preheater and the condensate $T_o$, (B.t.u./lb.)

However, in many cases the feed at the exit of the economizer will be partially vaporized, and so I prefer in such event to compute the feed enthalpy by the following equation:

$$F_e = C_{pF}(T_f - T_r) + (S/F)h_s + (B/F)C_{pB}(T_{b1} - T_{b2}) \qquad (13)$$

where:

$T_f$ = temperature of feed before entering economizer exchanger (° F.)
$C_{pB}$ = average specific heat of bottoms product (B.t.u./lb.×° F.)
$B$ = bottom flow (lb./hr.)
$T_{b1}$ = temperature of bottom product (B.t.u./lb.×° F.)
$T_{b2}$ = temperature of bottom product leaving economizer exchanger (° F.)

A feed enthalpy computer which can be used in the solution of Equation 13 is generally designated 121 of FIGURE 1. The temperatures $T_f$, $T_{b1}$ and $T_{b2}$ are detected by thermocouples 121, 122 and 123 respectively, and transmitted to feed enthalpy computer 121, together with a flow rate signal F from transmitter 63, a flow rate signal B from transmitter 59, and a flow rate signal S from transmitter 52. The output signal 124 from enthalpy computer 121 is proportional to the enthalpy $F_e$ of the feed above the reference temperature. This output signal 124 can be recorded by a recorder (not shown) and used for monotoring purposes only, or this output can be conveyed to a suitable enthalpy controller recorder 126 to which is supplied the desired enthalpy value as setpoint 127, the latter being proportional to a value that will result in the least operating costs for the column. The output of enthalpy controller 126 then manipulates the setpoint of steam flow controller 53 so as to maintain the enthalpy of the feed introduced into column 11 at a constant value. Although this particular arrangement assumes constant steam supply conditions, variations can be taken into account by proper measurements of the steam. Computer 121 would be modified to take this into account.

In FIGURE 2 I have illustrated in detail the feed enthalpy computer 121 of FIGURE 1. Referring now to FIGURE 2, differential temperature transducer 131 compares temperature signals $T_{b1}$ and $T_{b2}$, detected by thermocouples 122 and 123, respectively. Transducer 131 is calibrated to provide an output signal proportional to $C_{pB}(T_{b1} - T_{b2})$, the constant $C_{pB}$ taken care of by adjustment of the span. The output signal from transducer 131 is supplied to a multiplier 132. Signals proportional to the squares of the flow rates of bottom product and feed, as established by differential pressure transducer 59 and 63 respectively, are transmitted to square root extractors 133 and 93, respectively, and outputs from these extractors are transmitted to a divider 134. The output signal from the latter, proportional to $B/F$, is then transmitted to multiplier 132 where it is multiplied by $C_{pB}(T_{b1} - T_{b2})$, and the product signal therefrom is transmitted to an adder 136. Signals proportional to the squares of the flow rates of steam and feed, as established by differential pressure transducers 52 and 63, respectively, are transmitted to square root extractors 137 and 93, respectively. The outputs from these extractors are transmitted to a divider 138, and the output from the latter proportional to $(S/F)h_s$ is transmitted to adder 136, the constant $h_s$ being handled by adjusting the span of divider 138. The temperature $T_f$, detected by thermocouple 121 of feed line 12, and temperature $T_r$ are compared in a temeprature transmitter 139, which produces an output signal proportional to $C_{pB}(T_f - T_r)$, is also transmitted to adder 136, the constant $C_{pF}$ being added by adjustment of the span of transducer 139. Adder 136 adds the three input signals supplied thereto and produces an output signal 124 proportional to $F_e$; the total enthalpy of the feed with reference to $T_r$.

All the automatic control systems discussed herein can be utilized to drastically reduce the degrees of freedom of a distillation column. The major heat inputs to the column can all be regulated: reflux heat disturbances can be eliminated by the internal reflux measurement computer, disturbances in feed enthalpy can be eliminated by the feed enthalpy computer, and the disturbances in reboiler heat can be controlled by cascaded arrangement of bottom level controller. Disturbances caused by fluctuations in feed composition and feed flow can be compensated for by the predictive internal reflux computer and the predictive bottom product flow computer.

In another aspect of this invention, I propose to combine the internal reflux measurement equation with the predictive internal reflux equation. By combining Equation 6 with Equation 5, the following equation is developed:

$$R_{Ep} = \frac{F(1 + K_R \Delta T')}{(1 + K \Delta T)}\{K_1 + iC_5[K_2 + K_3(nC_4) + K_4(iC_5) + K_5(C_3 + iC_4)] + K_6(C_3 + iC_4)\} \qquad (14)$$

where:

$R_{Ep}$ = predicted external reflux flow rate (vol./unit time)

Figure 3:
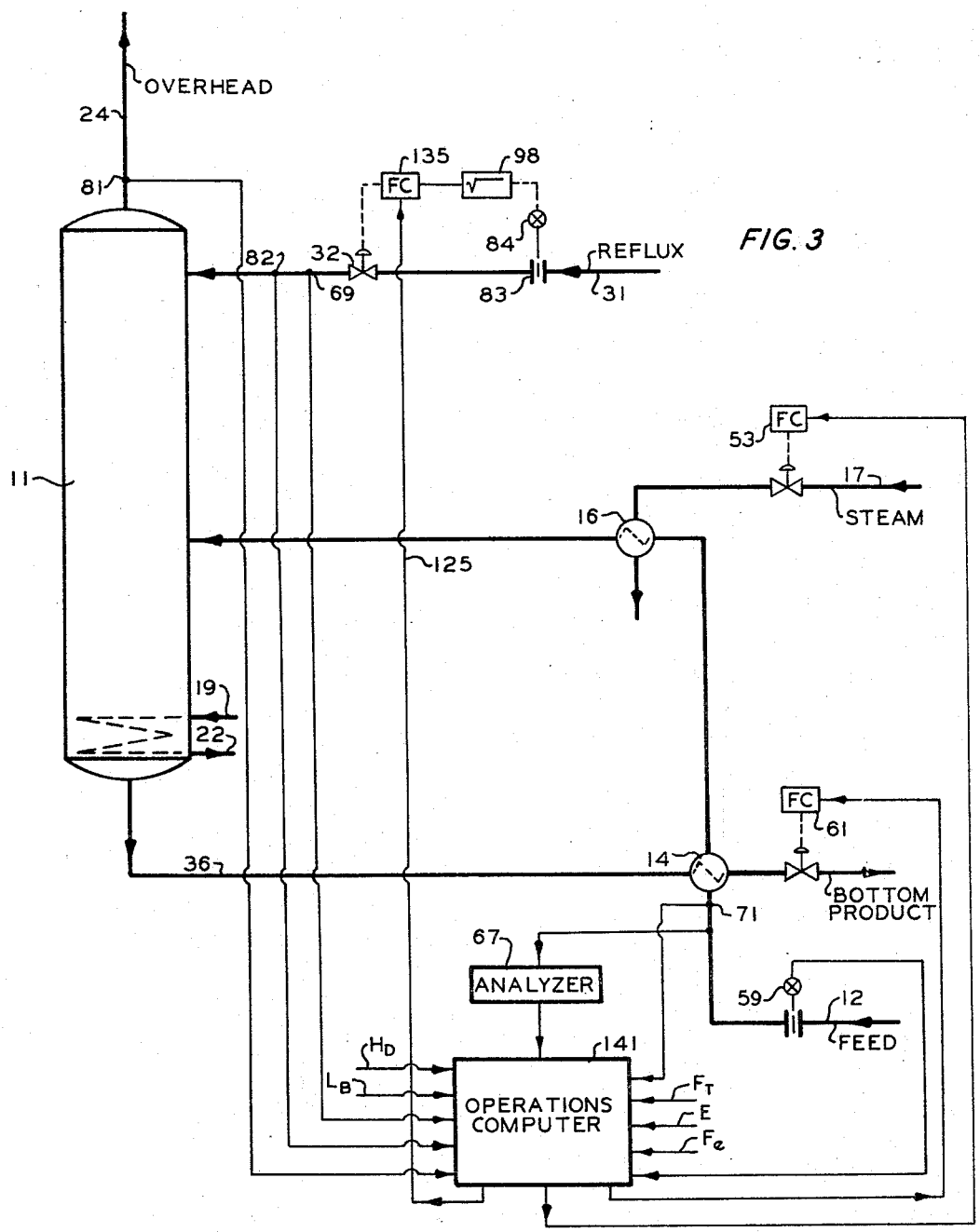
FIGURE 3 is a schematic diagram of a modification of FIGURE 1.

I have designated this modified computer as 141 in FIGURE 3. (In the interest of brevity, I have not illustrated in FIGURE 3 the computers 101 and 102 and the other appurtenances of FIGURE 1; computers 101 and 102 can be included in computer 141, and the latter termed an operations computer.) Instead of supplying signals proportional to the temperature $T_O$ of the overhead vapor, and the temperature $T_R$ of the external reflux to a separate computer for the measurement of internal reflux (such as computer 78 of FIGURE 1), such signals are instead transmitted to computer 141 for the solution of Equation 14. The components for this computation computer will be very similar to that shown as 66 and 78 in FIGURE 2, except that signal 76 proportional to the predicted internal reflux $R_{Ip}$ is transmitted to a divider where it is divided by output signal from temperature transducer 96 proportional to $(1 + K\Delta T)$ and the resulting quotient signal (125 in FIGURE 3) is transmitted directly to a flow controller 135 controlling the flow rate control valve 32 in the external reflux line 31. In this modification, the flow rate signal from square root extractor 93, proportional to the external reflux flow rate, is not transmitted to multiplier 97 (of FIGURE 1) but rather is directly transmitted to flow controller 135, the setpoint thereof being the $R_{Ep}$ of Equation 14 rather than the setpoint signal 76 of FIGURE 2.

As shown in FIGURE 1, a single distillation column can be instrumentated with a feed analyzer 67 and an overhead (or bottom product) analyzer 116 to achieve a predictable operation of that column. If column 11 is one column in a train of distillation columns, such as illustrated in FIGURE 4, each of such columns 1, 2 and 3 would have to be provided with two such analyzers. However, to avoid such costly installation and expense, I prefer to utilize that analyzer analyzing the product of more importance of one column for the dual purpose of analyzing the feed composition necessary to control the operation of the subsequent column which employs as feed a product from the preceeding column; thus, where the bottom product (or distillate) of one column serves as feed to a subsequent column in the train, I prefer to use that analyzer which analyzes the bottom product (or distillate) for purposes of feedback control to serve the dual purpose of analyzing such product for the necessary feed components used in the predictive control of the subsequent column which uses said product as feed. Referring to FIGURE 4, each of columns 1, 2 and 3 are provided with an operations computer 146, 147 and 148, respectively. Each of such operations computers can comprise in one unit the above-described combination of of the $R_{Ip}/F$ computer 66 (or $R_{Ep}$ computer 141) with the B computer 101, or the above-described combination of such computers with the $R_{Im}$ computer 78 and $F_e$ computer 121. Column 1 is provided with an overhead analyzer 149, for the purpose of determining in one phase of operation the concentration of the heavy key component in the overhead, so as to bias the computed bottom product flow of that column. In addition, analyzer 149 of column 1, in another phase of operation, analyzes the overhead to determine the concentration of components of interest, and this composition information is transmitted to the operations computer 147 of column 2, since the feed to this latter column will consist of the distillate $D_1$ from column 1. In the case of column 2, the product of interest here is the bottom product $B_2$ and the analyzer 151, in one phase of its operation, determines the concentration of the light key component in the bottom product $B_2$, and sends a corrective signal to bias relay 152 for purposes of feedback control. In another phase of its operation, analyzer 151 analyzes the bottom product $B_2$ to determine the concentration of those components necessary in the solution of the predictive equation solved by operations computer 148 of column 3, which column employs as feed the bottom product $B_2$ of column 2. In the train of fractionators illustrated in FIGURE 4, the total number of analyzers required for predictive and feedback control would be four.

In describing the various aspects of this invention thus far, no attention has been given to column dynamics, and the predictions of internal reflux and bottom product flow are accurate and satisfactory where changes in feed flow and feed composition are relatively small. The equations for prediction of internal reflux and bottom product flow are in fact steady-state equations. However, where there are relatively large, material and frequent changes in feed flow or feed composition, I propose to take into account the dynamics of the column and modify the predictive control systems. Material changes in these variables of feed composition and feed flow necessitates compensation for the process dynamics of dead-time and exponential response in making the reflux and bottom flow adjustments to minimize changes in product composition.

Dead-time is the time elapsing between the initiation of a process change and the detection (or manifestation) of the effect of the change at another point in the process system. Exponential response is the exponential change in a variable resulting from a step change in input.

To illustrate the problem when there is a material change in feed flow, the following happens when the column depicted in FIGURE 1 is operated without compensation for dead-time and exponential response. Assume that column 11 has 1200 units of feed, that the split is such that 850 units of overhead and 350 units of bottom product result, and that the internal reflux is 1050 units. An abrupt change in feed flow to 1300 units will immediately increase the bottom product to 379 units by action of the bottom product flow computer 101, and the internal reflux will increase abruptly to 1083 by action of the internal reflux computer 66. The increase in bottom product flow will decrease the reboiler heat in an amount compatible with the 29 units increase in bottom product flow because of the reboiler level controller action. Overhead product will change from 850 units to 750 units because of the immediate increase in reflux. Both reboiler heat and overhead product flow have responded in the wrong direction. Eventually reboiler heat will increase because of an increase in liquid flow down the column due to the initial increase in reflux flow. All variables will return to their proper values in time but during the transient period reboiler heat and reflux flow respond in the wrong directions. These responses may in turn be transmitted to succeeding columns in the train.

When changes in feed flow occur, it is necessary to lag the adjustments to reflux flow and bottom product flow so that both the overhead and bottom products flows will respond in the proper direction without overshoot in the least time. Such adjustments will result in establishing the proper liquid to vapor flow ratios within the column in minimum time, thereby the smallest possible deviation in terminal product compositions will result. The lags necessary to accomplish this are determined by the column material flow dynamics.

Conpensation for dead-time can be made by first, second, third, fourth and $n$th order dead-time simulators, depending upon process dynamics of the system. Such dead-time simulators are described in said copending application Serial No. 125,025. Compensation for exponential response can be made by the use of first, second, third and $n$th order interacting or noninteracting legs, depending upon the process dynamics of the system. Such exponential response compensators are also disclosed in said copending application Serial No. 125,025.

When a change in feed flow occurs, the flow from the feed tray down the column will be lagged by each tray. If there are 25 trays from the feed tray to the column bottom, the dynamic character of the flow process will be a 25th order non-interacting lag. Each tray is essentially a first order lag. It is necessary to lag the bottom flow adjustment at least the same amount or heat to the reboiler will respond in the wrong direction due to action of the bottom level controller. Lag 163, FIGURE 1, must exhibit slightly longer lags than the 25th order liquid flow lag described in order to get a reboiler heat change in minimum time. The use of equipment necessary to simulate a 25th order lag for device 163 would be expensive. Therefore, the desired lag is approximated with an approximate dead-time device and a low order lag system. Such devices are described in said copending application Serial No. 125,025. The parameters (time constants and gains) for the approximate lag devices are usually determined experimentally when installed on the column.

Device 162 required to lag the internal reflux adjustment as a function of feed flow changes is basically the same as device 163. The parameters of device 163 are usually adjusted to give slightly longer lags than are used for lag 162. The requirements for lag 163 are the same as lag 162 except for the fact that lag 163 must also include the lags necessary to simulate the vapor flow from the bottom of the column to the reflux accumulator.

Changes in feed composition may be of such a nature to require dynamic compensation similar to that required for feed flow changes. This is seldom the case. Sudden change in feed composition to distillation columns is rare. When the changes are slow, no dynamic compensation is required. Straight steady-state corrections are satisfactory. Of course, whenever, sudden changes in feed compensation can occur, lags will need to be introduced in each of the feed component measurement signals.

In general, the lags required are multiorder in nature. Approximation would also be used for these as an economic measure.

Where in that aspect of the invention illustrated in FIGURE 4 the analyzer 149 is used in determining the concentration of stream components for purpose of internal reflux prediction by computer 147, it will also be necessary to delay the transmission of this composition information to computer 147. This is because there will be a definite lag between the time such analysis is made and the time that the liquid in accumulator 10 is introduced as feed into column 2. To accomplish the lag of this signal, I prefer to interpose a lag means 166 between computer 147 and analyzer 149, such lag means having dynamics equivalent to accumulator 10. Accumulator 10 will have a response to compositional changes lying between a pure dead-time system (slug flow) and perfect mixing exponential lag (stirred tank). An example of such lag means is the combination of a 3rd order exponential lag and a 2nd order dead-time model.

Similarly, the composition information fed by analyzer 151 to reflux computer 148 must be delayed to compensate for the difference in time between that time when the analysis of the bottom product of column 2 is made by analyzer 151 and that time when such bottom product is introduced as feed into column 3. For this purpose I can interpose an appropriate lag means 167 which will have dynamics equivalent to this part of the process.

In one form of the invention, the described control system is operated by air pressure. For example, transmitter 52, 59 and 63 can all supply air pressure proportional to the measured properties and the adding relays and force bridges, in turn modify and supply air pressure signals. If air pressures are used, it is necessary to provide supply air to the various components but it has not been thought necessary to show such an air supply system since such systems are well known in the art and to show such a system here would simply complicate the drawing unnecessarily.

All of the various components, that is, the sensing elements, transmitters, adding relays, dividers, multipliers, square root extractors, bias relays, flow controller valves, etc., are well known in the art, and therefore, details of their construction have not been shown here. For example, Taylor Transmitter No. 317 RG, described in Taylor Instrument Company brochure 2B100 of December, 1952, may be used for temperature transmitters. Adding relays may consist of the Foxboro Model 56 Computing Relay, described in Catalog 37–A–57a, September 12, 1956, of the Foxboro Company. The Sorteberg Force Bridge, described in Catalog C80–1–5M, December, 1956, of the Minneapolis-Honeywell Company, may be used for dividers, square root extractors, multipliers, etc. Foxboro Model M/40 Controller, described in Bulletin 5A–10A, November, 1955, of the Foxboro Company, may be used for flow rate controllers. All electronic components can be employed. These are also well known in the art.

Various modifications and alterations of this invention will become apparent to those skilled in the art without departing from the scope and spirit of this invention, and it should be understood that the foregoing description and accompanying drawing should not be construed to limit unduly this invention.

I claim:

1. In a process wherein a multicomponent feed stream is separated in a fractional distillation column into an overhead vapor stream and a liquid bottom product stream having a specified purity, said overhead stream is condensed, some of the condensed overhead is recycled to said column as an external reflux stream, and some of said condensed overhead is yielded as a distillate product stream having a specified purity, a control method therefor comprising the steps of measuring a process variable indicative of the flow rate of said feed stream; measuring the amounts of feed components in said feed stream; producing signals proportional to said measurements; combining said signals together with signals proportional to constants in a statistically derived equation based on the expression:

$$R_{Ip} = f(F, F_c, E, F_T, F_e, H_D, L_B)$$

where:

$R_{Ip}$ = predicted internal reflux flow rate for said column
$F$ = flow rate of said feed stream
$F_c$ = generic symbol for the amounts of said feed components expressed as fractions of said feed stream
$E$ = tray efficiency of said column
$F_T$ = feed tray of said column, numbering trays from the top of said column
$F_e$ = enthalpy of said feed stream
$H_D$ = specified fraction of heavy key component in said distillate product stream
$L_B$ = specified fraction of light key component in said bottom product stream, producing a signal proportional to said $R_{Ip}$; measuring process variables indicative of the internal reflux flow rate of said column; producing a signal $R_{Im}$ proportional thereto; comparing said signals $R_{Ip}$ and $R_{Im}$; and manipulating the flow rate of said external reflux stream in accordance with said comparison to produce at an optimum said distillate and bottom product streams with said purities $H_D$ and $L_B$, respectively.

2. In a process wherein a multicomponent feed stream is separated in a fractional distillation column into an overhead vapor stream and a liquid bottom product stream having a specified purity, said overhead stream is condensed, some of the condensed overhead is recycled to said column as an external reflux stream, and some of said condensed overhead is yielded as a distillate product stream having a specified purity, a control method therefore comprising the steps of measuring the amounts of feed components in said feed stream; producing signals responsive to said measurements; combining said signals together with signals proportional to constants in a statistically-derived equation based on the expression:

$$R_{Ip}/F = f(F_c, E, F_T, F_e, H_D, L_B)$$

where:

$R_{Ip}/F$ = ratio of predicted internal reflux flow rate-to-feed flow rate for said column
$F_c$ = generic symbol for the amounts of said feed components expressed as fractions of said feed stream
$E$ = tray efficiency of said column
$F_T$ = feed tray of said column, numbering trays from the top of said column
$F_e$ = enthalpy of said feed stream
$H_D$ = specified fraction of heavy key component in said distillate product stream
$L_B$ = specified fraction of light key component in said bottom product stream, measuring process variables indicative of the flow rate of said feed stream; producing a signal proportional to said $R_{Ip}/F$; multiplying the latter signal by said signal proportional to said feed flow rate; producing a signal proportional to $R_{Ip}$; measuring process variables indicative of the internal reflux flow rate of said column; producing a signal $R_{Im}$ responsive to said variables indicative of said internal reflux flow rate; comparing said signals $R_{Ip}$ and $R_{Im}$ and manipulating the flow rate of said external reflux stream in accordance with said comparision to produce at an optimum said distillate and bottom product streams with said purities $H_D$ and $L_B$, respectively.

3. In the process according to claim 2, wherein said internal reflux flow rate is computed by measuring the temperature difference between said external reflux stream and said overhead vapor stream; producing a signal $\Delta T$ responsive thereto; measuring process variables indicative of the flow rate of said external reflux stream; producing a signal $R_{Em}$ responsive to said measured process variables indicative of said external reflux stream; combining the latter two signals according to the equation:

$$R_{Im} = R_{Em}(1 + K\Delta T)$$

where:

$K = C_p\lambda$
$C_p$ = specific heat of said external reflux stream
$\lambda$ = heat of vaporization of liquid in the top of said columns.

4. In the process according to claim 3 wherein said column is a debutanizer column and said feed stream comprises a mixture of propane, isobutane, normal butane, isopentane, normal pentane, and hexane, and wherein the heavy key component in said distillate product stream is isopentane and the light key component in said bottom product stream is normal butane.

5. In a process wherein a multicomponent feed stream is separated in a fractional distillation column into an overhead vapor stream and a liquid bottom product stream having a specified purity, said overhead stream is condensed, some of the condensed overhead is recycled to said column as an external reflux stream, and some of said condensed overhead is yielded as a distillate product stream having a specified purity, a control method therefor comprising the steps of measuring the amounts of feed components in said feed stream; producing signals responsive to said measurements; combining said signals together with signals proportional to constants in a statistically-derived equation based on the expression:

$$R_{Ip}/F = f(F_c, E, F_T, F_e, H_D, L_B)$$

where:

$R_{Ip}/F$ = ratio of predicted internal reflux flow rate-to-feed flow rate for said column
$F_c$ = generic symbol for the amounts of said feed components expressed as fractions of said feed stream
$E$ = tray efficiency of said column
$F_T$ = feed tray of said column, numbering trays from the top of said column
$F_e$ = enthalpy of said feed stream
$H_D$ = specified fraction of heavy key component in said distillate product stream
$L_B$ = specified fraction of light key component in said bottom product stream, measuring process variables indicative of the flow rate of said feed stream; producing a signal in response to said measured process variables indicative of said flow rate; producing a signal proportional to said $R_{Ip}/F$; multiplying the latter signal by said signal proportional to said feed flow rate and producing a signal proportional to $R_{Ip}$, measuring the temperature difference between said external reflux stream and said overhead stream and producing a signal $\Delta T$ responsive to said temperature difference; measuring process variables indicative of the flow rate of said external reflux stream; producing a signal $R_{Em}$ responsive to said measured process variables indicative of said external reflux stream; combining the latter two signals according to the equation:

$$R_{Im} = R_{Em}(1 + K\Delta T)$$

where:

$R_{Im}$ = measured internal reflux flow rate of said column
$K = C_p/\lambda$
$C_p$ = specific heat of said external reflux stream
$\lambda$ = heat of vaporization of liquid in the top of said column, comparing said signals $R_{Ip}$ and $R_{Im}$ and manipulating the flow rate of said external reflux stream in accordance with said comparison to produce said distillate and bottom product streams with said purities $H_D$ and $L_B$, respectively; analyzing one of said overhead and bottom product streams to determine the concentration of a specified key component thereof and producing a feedback signal responsive to said concentration; measuring the amounts of the light key feed component and feed components lighter than the same in said feed stream; producing signals responsive thereto; combining the latter signals with said feed flow rate signal in a predictive equation derived from a material balance around said column and based on the expression:

$$B = f(F_c, F, H_D, L_B)$$

where:

$B$ = predicted bottom product flow rate
$F_c$ = generic symbol for the sum of the amounts of said light key feed component and feed components lighter than the same
$F, H_D, L_B$ = as defined above, producing a signal proportional to B, comparing said signal B with said feedback signal and manipulating the flow rate of said bottom product stream in accordance with said comparison.

6. In the process according to claim 5, wherein said feedback signal is obtained from a measurement of the heavy key component in said overhead stream.

7. In the process according to claim 5, wherein said feedback signal is obtained from a measurement of the light key component in said bottom product stream.

8. In a process wherein a multicomponent feed stream is separated into fractions in a train of fractional distillation columns, where each of said columns separates a column feed stream into an overhead vapor stream and a liquid bottom product stream having a specified purity, said overhead is condensed, some of the condensed overhead is recycled to said column as an external reflux stream, and some of said condensed overhead is yielded as a distillate product stream having a specified purity, and wherein one of said distillate and bottom products streams of one of said columns comprises the column feed of a subsequent column in said train, a control method wherein the flow rates of said external reflux streams and bottom product streams of each of said columns is controlled to insure that each of said columns produces at an optimum distillate and bottom products streams of specified purities, said control method with respect to each of said columns comprising the steps of measuring the amounts of feed components in a first feed stream to a first column and producing signals proportional thereto, combining said signals together with signals proportional to constants in a statistically-derived equation based on the expression:

$$\frac{R_{Ip}}{F} = f(F_c, E, F_T, F_e, H_D, L_B)$$

where:

$R_{Ip}/F$ = ratio of predicted internal reflux flow rate-to-feed flow rate for said first column
$F_c$ = generic symbol for the amounts of said feed components expressed as fractions of said first feed stream
$E$ = tray efficiency of said first column
$F_T$ = feed tray of said first column, numbering from the top of said first column
$F_e$ = enthalpy of said first feed stream
$H_D$ = specified fraction of heavy key component in said distillate product stream of said first column
$L_B$ = specified fraction of light key component in said bottom product stream of said first column, producing a signal proportional to $R_{Ip}/F$, multiplying the latter signal by a signal proportional to the flow rate of said first feed stream and producing a signal proportional to $R_{Ip}$, measuring the temperature difference between said external reflux stream of said first column and said overhead stream of said first column and producing a signal $\Delta T$ proportional thereto, measuring the flow rate of said external reflux stream of said first column and producing a signal $R_{Em}$ proportional thereto, combining the latter two signals according to the equation:

$$R_{Im} = R_{Em}(1 + K\Delta T)$$

where:

$R_{Im}$ = measured internal reflux flow rate of said first column
$K = C_p/\lambda$
$C_p$ = specific heat of said external reflux stream of said first column
$\lambda$ = heat of vaporization of liquid in the top of said first column
$R_{Im}$ = measured internal reflux flow rate of said first column, comparing said signals $R_{Ip}$ and $R_{Im}$ and manipulating the flow rate of said external reflux stream to said first column in accordance with said comparison, analyzing one of said overhead and bottom product streams of said first column to determine the concentration of the specified key component thereof and producing a feedback signal proportional thereto, measuring the amounts of the light key feed component and feed components lighter than the same in said first feed stream and producing signals proportional thereto, combining the latter signals with said flow rate signal of said first feed stream in a predictive equation derived from a material balance around said first column and based on the expression:

$$B = f(F_c, F, H_D, L_B)$$

where:

$B$ = predicted bottom product flow rate of said first column
$F_c$ = generic symbol for the sum of the amounts of said light key feed component and feed components lighter than the same in said first feed stream
$F, H_D, L_B$ = as defined above for said first column, producing a signal proportional to B, comparing said signal B with said feedback signal and manipulating the flow rate of said bottom product stream of said first column in accordance therewith, and repeating said control method for each of said columns in said train.

9. In the process according to claim 8, wherein said feedback signal used in the control of the flow rate of said bottom product stream is obtained by analysis of a product stream employed as feed in a subsequent column in said train.

10. In a fractionation system wherein a multicomponent feed stream is passed into a fractional distillation column, an overhead vapor stream is withdrawn from the top of said column and condensed, some of the condensed overhead is recycled to said column as an external reflux stream, some of said condensed overhead is yielded as a distillate product stream having a specified purity, and a liquid bottom product stream having a specified purity is withdrawn from the bottom of said column, a control system comprising means to measure a process variable indicative of the flow rate of said feed stream; means responsive to said measuring means to establish a signal proportional to the flow rate of said feed stream; means to measure amounts of feed components in said feed stream; means responsive to said feed component measurements to establish a signal proportional to the amounts of feed components in said feed stream; means to combine said feed component signals and said flow rate signals in a statistically-derived equation to establish a signal $R_{Ip}$ proportional to a predicted value for the internal reflux flow rate of said column, said equation being based on the expression:

$$R_{Ip} = f(F, F_c, E, F_T, F_e, H_D, L_B)$$

where:

$R_{Ip}$ = predicted internal reflux flow rate for said column
$F$ = flow rate of said feed stream
$F_c$ = generic symbol for the amounts of said feed components expressed as fractions of said feed stream
$E$ = tray efficiency of said column
$F_T$ = feed tray of said column, numbering trays from the top of said column
$F_e$ = enthalpy of said feed stream
$H_D$ = specified fraction of heavy key component in said distillate product stream
$L_B$ = specified fraction of light key component in said bottom product stream, means to measure process variables indicative of the internal reflux flow rate of said column; means responsive to said process variable measurements to establish a signal $R_{Im}$ proportional to the internal reflux flow rate of said column; means to compare said signals $R_{Ip}$ and $R_{Im}$; means responsive to said comparison to establish a control signal proportional thereto; and means responsive to said control signal to manipulate the flow rate of said external reflux stream, whereby said column is operated to produce optimum distillate and bottom product streams of said specified purities.

11. In a fractionation system wherein a multicomponent feed stream is passed into a fractional distillation column, an overhead vapor stream is withdrawn from the top of said column and condensed, some of the condensed overhead is recycled to said column as an external reflux stream, some of said condensed overhead is yielded as a distillate product stream having a specified purity, and a liquid bottom product stream having a specified purity is withdrawn from the bottom of said column, a control system comprising means to measure process variables indicative of the amounts of feed components in said feed stream; means responsive to said feed component measurements to establish signals proportional to the amounts of feed components in said feed stream; means to combine said signals in a statistically-derived equation to establish a signal $R_{Ip}/F$ based on the expression:

$$R_{Ip}/F = f(F_c, E, F_T, F_e, H_D, L_B)$$

where:

$R_{Ip}/F$ = ratio predicted internal reflux flow rate-to-feed flow rate for said column
$F_c$ = generic symbol for the amounts of said feed components expressed as fractions of said feed stream
$E$ = tray efficiency of said column
$F_T$ = feed tray of said column, numbering trays from the top of said column
$F_e$ = enthalpy of said feed stream
$H_D$ = specified fraction of heavy key component in said distillate product stream
$L_B$ = specified fraction of light key component in said bottom product stream, means to measure process variables indicative of the flow rate of said feed stream; means responsive to said feed flow rate measurements to establish a signal F proportional to the flow rate of said feed stream; means to multiply said signals $R_{Ip}/F$ and F to establish a signal $R_{Ip}$ proportional to a predicted value for the internal reflux flow rate of said column, means to measure the temperature difference between said overhead stream and said external reflux stream; means responsive to said temperature measurement to establish a signal $\Delta T$ proportional to the temperature difference between said overhead stream and said external reflux stream; means to measure process variables indicative of the flow rate of said external reflux stream; means responsive to said external reflux stream measurements to establish a signal $R_{Em}$ proportional to the flow rate of said external reflux stream; means responsive to said signals $\Delta T$ and $R_{Em}$ to establish a signal $R_{Im}$ proportional to the interal reflux flow rate of said column, said signal $R_{Im}$ being established from the relationship:

$$R_{Im} = R_{Em}(1 + K\Delta T)$$

where:

$K = C_p/\lambda$ $C_p$ = a constant representative of the specific heat of said external reflux stream $\lambda$ = a constant representative of the heat of vaporization of liquid in the top of said column, means to compare said signals $R_{Ip}$ and $R_{Im}$ to establish a control signal proportional thereto; and means responsive to said control signal to manipulate the flow rate of said external reflux stream, whereby said column is operated to produce optimum distillate and bottom product streams of said specified purities.

12. In a fractionation system wherein a multicomponent feed stream is passed into a fractional distillation column, an overhead vapor stream is withdrawn from the top of said column and condensed, some of the condensed overhead is recycled to said column as an external reflux stream, some of said condensed overhead is yielded as a distillate product stream having a specified purity, and a liquid bottom product stream having a specified purity is withdrawn from the bottom of said column, a control system comprising means to measure process variables indicative of the amounts of feed components in said feed stream; means responsive to said feed component measurements to establish signals proportional to the amounts of feed components in said feed stream, means to combine said signals in a statistically-derived equation to establish a signal $R_{Ip}/F$ on the expression:

$$R_{Ip}/F = f(F_c, E, F_T, F_e, H_D, L_B)$$

where:

$R_{Ip}/F$ = ratio of predicted internal reflux flow rate-to-feed flow rate for said column $F_c$ = generic symbol for the amounts of said feed components expressed as fractions of said feed stream $E$ = tray efficiency of said column $F_T$ = feed tray of said column, numbering trays from the top of said column $F_e$ = enthalpy of said feed stream $H_D$ = specified fraction of heavy key component in said distillate product stream $L_B$ = specified fraction of light key component in said bottom product stream, means to measure process variables indicative of the flow rate of said feed stream; means responsive to said flow rate measurements to establish a signal F proportional to the flow rate of said feed stream; means to multiply said signals $R_{Ip}/F$ and F and to establish a signal $R_{Ip}$ proportional to a predicted value for the internal reflux flow rate of said column; means to measure the temperature difference between said overhead stream and said external reflux stream; means responsive to said temperature measurement to establish a signal $\Delta T$ proportional to the temperature difference between said overhead stream and said external reflux stream; means to measure process variables indicative of the flow rate of said external reflux stream; means responsive to said external reflux stream measurements to establish a signal $R_{Em}$ proportional to the flow rate of said external reflux stream; means responsive to said signal $\Delta T$ and $R_{Em}$ to establish a signal $R_{Im}$ proportional to the internal reflux flow rate of said column, said signal $R_{Im}$ being established from the relationship:

$$R_{Im} = R_{Em}(1 + K\Delta T)$$

where:

$K = C_p/\lambda$ $C_p$ = a constant representative of the specific heat of said external reflux stream $\lambda$ = constant representative of the heat of vaporization of liquid in the top of said column, means to compare said signals $R_{Ip}$ and $R_{Im}$ to establish a control signal proportional thereto; means responsive to said control signal to manipulate the flow rate of said external reflux stream; means to establish a feedback signal proportional to the concentration of a specified key component of one of said overhead and bottom product streams; means to establish signals proportional to the light key feed component and feed components lighter than the same in said feed stream; means to combine the latter signals and establish a signal B proportional to a predicted value for the flow rate of said bottom product stream, said signal B being established from a predictive equation derived from a material balance around said column and based on the expression:

$$B = f(F_c, F, H_D, L_B)$$

where $F_c$ is a generic symbol for the sum of the amounts of said light key feed component and feed component lighter than the same in said feed stream, and where F, $H_D$ and $L_B$ are as defined above, and means to compare said signal B and said feedback signal and manipulate the flow rate of said bottom product stream.

References Cited by the Examiner

UNITED STATES PATENTS

| | | | |
|---|---|---|---|
| 2,882,693 | 4/1959 | Clay | 202—160 |
| 2,893,927 | 7/1959 | Mertz | 202—160 |
| 2,900,334 | 8/1959 | Miller | 202—160 |
| 2,972,446 | 2/1961 | White | 235—150.1 |
| 2,972,447 | 2/1961 | White | 202—160 |
| 3,018,229 | 1/1962 | Morgan | 202—160 |
| 3,034,307 | 5/1962 | Berger. | |
| 3,079,079 | 2/1963 | Phister et al. | 235—150.1 |
| 3,143,643 | 8/1964 | Fluegel et al. | 235—151.12 |

FOREIGN PATENTS 1,177,743  4/1959  France.

OTHER REFERENCES

Petroleum Refiner: J. F. Pink, March 1959, vol. 38, No. 3, pages 215–220.

NORMAN YUDKOFF, *Primary Examiner.*

WILBUR BASCOMB, *Examiner.*

M. H. SILVERSTEIN, *Assistant Examiner.*